United States Patent
Snider

(10) Patent No.: US 8,356,484 B2
(45) Date of Patent: Jan. 22, 2013

(54) HYBRID WOBBE CONTROL DURING RAPID RESPONSE STARTUP

(75) Inventor: David August Snider, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 684 days.

(21) Appl. No.: 12/434,015

(22) Filed: May 1, 2009

(65) Prior Publication Data

US 2010/0275609 A1    Nov. 4, 2010

(51) Int. Cl.
*F02C 7/22* (2006.01)
*F02C 7/224* (2006.01)
*F02C 9/26* (2006.01)

(52) U.S. Cl. ............ 60/776; 60/39.281; 60/736; 60/734

(58) Field of Classification Search ............... 60/734, 60/39.281, 776, 736, 778, 786
See application file for complete search history.

(56) References Cited

U.S. PATENT DOCUMENTS

| | | | |
|---|---|---|---|
| 6,082,092 A * | 7/2000 | Vandervort | 60/736 |
| 7,895,821 B2 * | 3/2011 | Annigeri et al. | 60/39.281 |
| 2006/0046218 A1 * | 3/2006 | Joklik et al. | 431/75 |
| 2007/0113560 A1 * | 5/2007 | Steber et al. | 60/39.281 |
| 2008/0115482 A1 * | 5/2008 | LaGrow et al. | 60/734 |
| 2008/0289339 A1 * | 11/2008 | Asti et al. | 60/734 |

* cited by examiner

*Primary Examiner* — Ted Kim
(74) *Attorney, Agent, or Firm* — Cooper Legal Group, LLC

(57) ABSTRACT

According to one aspect, the subject application involves a method of controlling a transition of a gas turbine. The method includes receiving a request of the gas turbine to drive an increased load. The increased load is greater than a load being driven by the gas turbine when the request is received. The method further includes determining that a temperature of a fuel to be ignited within a combustor of the gas turbine is less than a target temperature of the fuel to be introduced into the combustor for driving the increased load. Responsive to this determination, the method also includes controlling introduction of an additive into the combustor of the gas turbine when the temperature of the fuel is less than the target temperature to establish a suitable Wobbe Index of a fuel combination to promote a substantially continuous transition of the gas turbine to drive the increased load, wherein the fuel combination includes the fuel and the additive.

18 Claims, 3 Drawing Sheets

HYBRID WOBBE CONTROL DURING RAPID RESPONSE STARTUP

BACKGROUND OF THE INVENTION

1. Field of the Invention

This application relates generally to a method and apparatus for minimizing a startup time of a gas turbine, and more specifically to method and apparatus for controlling a Wobbe Index of a fuel supplied to the gas turbine to minimize delays in turbine loading to allow the fuel to be heated before being delivered to the gas turbine.

2. Description of Related Art

Industrial turbines are often gas-fired and are commonly employed to drive loads such as generators installed at electric power plants to produce electric energy. Such gas turbines are designed to burn a specific range of fuels, and to burn such fuels under specific conditions, such as fuel temperature. The fuel composition and temperature are used to calculate a term know as the Wobbe index which speaks to the heating value of the fuel on a volume basis. The range of fuel flow from no load to base load, as well as the Wobbe index, are used to determine the fuel staging, or modes, within the combustor and other details such as the nozzle sizing.

In order to achieve higher plant efficiency at loads where continuous operation is expected, the fuel may be heated to a specific temperature. The heating of the fuel lowers the Wobbe index as the higher temperature increases the volume of the fuel at the same pressure. Operation of the turbine at a Wobbe index outside the design range may generate undesirable acoustic resonances that can damage the turbine hardware or result in the loss of flame in the combustor. In these cases, the elevated fuel temperature becomes a control permissive to enter these combustion modes to assure that the fuel has the required Wobbe index. If the fuel temperature has not been raised within the required range, then the system must hold at a given load until the temperature permissive has been met.

Gas turbines are also frequently called upon to drive large loads such as generators soon after a request for operation of the gas turbine is made. The gas turbine is expected to respond rapidly to a request for operation and quickly transition from an idle, or off mode in which the gas turbine produces no output power to a full load mode in which the gas turbine is driving the complete load per the operator's request. However, many gas turbine installations rely on their own hot exhaust gases or steam from a bottoming cycle to warm the fuel to be delivered to the combustor. Since it takes time for the exhaust gases to rise to their standard operating temperature the fuel initially delivered to the combustor immediately after startup of the gas turbine is initiated is lower than a target temperature of the fuel for which the gas turbine was designed. Introducing fuel below the target temperature can result in a Wobbe Index outside the desired range, possibly leading to combustion dynamics that can damage the gas turbine. And if a rapid response is required of the gas turbine to quickly drive a large load from startup, there will not be enough time to adequately preheat the fuel to an acceptable temperature to satisfy the demands of that specific load. Thus, the gas turbine is forced to burn the fuel below its target temperature and risk damage or experience a delay during startup, which may not be an option depending on the load to be driven.

To avoid a scenario where the gas turbine burns insufficiently-heated fuel at startup some installations including gas turbines also include a separate, stand-alone boiler to heat the fuel before it is delivered to the gas turbine at startup. However, to meet the rapid response startup demands of a large load as mentioned above the auxiliary boiler must be maintained in an active, fired state, and on standby at all times, even when the gas turbine is not actively operating. Continuously maintaining such a boiler on standby at all times consumes significant amounts of energy, is costly, and wasteful.

Accordingly, there is a need in the art for a method and apparatus for minimizing the fuel effects during a transition of a gas turbine from a first loaded state to a second loaded state where the load being driven is greater than in the first loaded state. Such a method and apparatus can optionally adjust a Wobbe Index of a fuel, at least temporarily, until such time as the temperature of the fuel can be sufficiently elevated to satisfy a change in load on the gas turbine. The method and apparatus can optionally adjust the Wobbe Index of the fuel based on a composition of the fuel, and can optionally adjust the Wobbe Index in this manner in parallel with heating of the fuel.

BRIEF SUMMARY

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

According to one aspect, the present invention provides a method of controlling a transition of a gas turbine. The method includes receiving a request of the gas turbine to drive an increased load. The increased load is greater than a load being driven by the gas turbine when the request is received. The method further includes determining that a temperature of a fuel to be ignited within a combustor of the gas turbine is less than a target temperature of the fuel to be introduced into the combustor for driving the increased load. Responsive to this determination, the method also includes controlling introduction of an additive into the combustor of the gas turbine when the temperature of the fuel is less than the target temperature to establish a suitable Wobbe Index of a fuel combination to promote a substantially continuous transition of the gas turbine to drive the increased load, wherein the fuel combination includes the fuel and the additive.

According to another aspect, the present invention provides a gas turbine for driving a load. The gas turbine includes a compressor for elevating a pressure of air being introduced to the gas turbine, a combustor in which a fuel is to be burned during operation of the gas turbine, and a turbine disposed downwind of the combustor to be driven by a hot gas being forced through the gas turbine. The gas turbine also includes a controller for controlling operation of the gas turbine during a transition of the gas turbine from driving an initial load to driving an increased load. The controller includes a receiver component for receiving a request for the gas turbine to drive the increased load, wherein the increased load is greater than the initial load being driven by the gas turbine when the request is received. The controller also includes a comparison component for determining that a temperature of a fuel to be ignited within a combustor of the gas turbine is less than a target temperature of the fuel to be introduced into the combustor for driving the increased load. A computational component of the controller controls introduction of an additive into the combustor of the gas turbine when the temperature of the fuel is less than the target temperature to establish a suitable Wobbe Index of a fuel combination to promote a substantially continuous transition of the gas turbine to drive the increased load. The fuel combination includes the fuel and the additive.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DESCRIPTION OF EXAMPLE EMBODIMENTS

Figure 1:
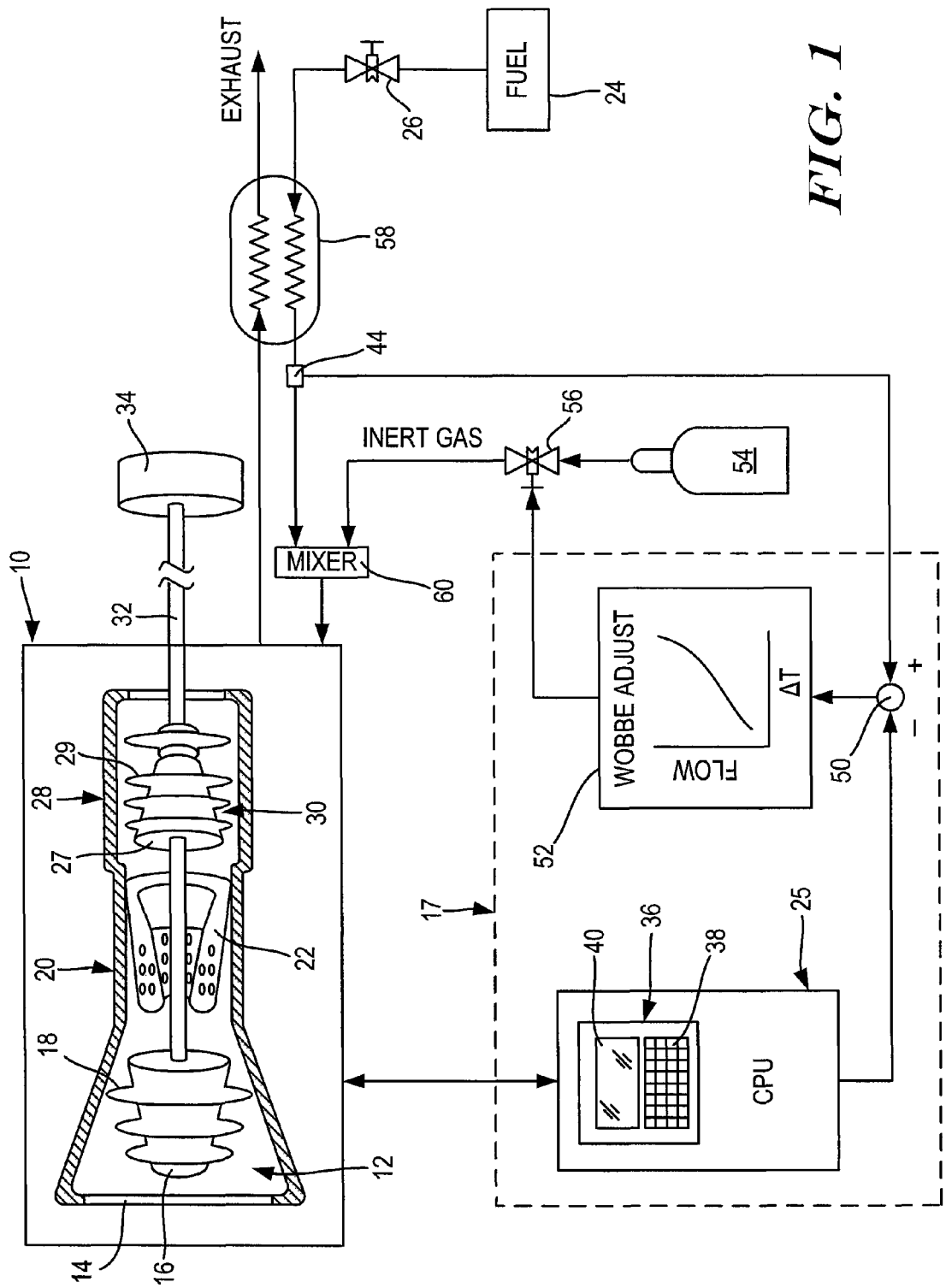
FIG. 1 shows a schematic representation of a gas turbine and control system that is operable to minimize a startup time of the gas turbine to meet a load demand.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Referring initially to FIG. 1, the subject application relates to a method and system 17 for controlling a gas turbine 10 for driving a load such as a generator 34 for generating electric energy. As shown, the gas turbine is a schematic representation and shows certain components only for the purpose of explanation or the inventive concepts of the present invention. The schematic drawings should not be interpreted as showing all dimensions and constructions. The gas turbine 10 includes a compressor 12 for elevating a pressure of air as the air moves through the compressor from an inlet 14 of the compressor to an outlet of the compressor. The compressor 12 includes a hub 16 supporting an array of fan blades 18 that are rapidly rotated to force air into the gas turbine 10. A combustor 20 includes a fuel delivery device 22 that includes fuel injectors or nozzles that introduce fuel into the combustor. Such fuel is supplied to the gas turbine 10 from a fuel supply. The person of ordinary skill in the art will appreciate that the fuel travels a path from the fuel supply to the gas turbine 10 and is accordingly routed within the turbine to the combustor. Thus, details of such routing path need not be shown. Along the path, a fuel flow controller such as a valve 26 can be adjusted to control at least one value (e.g. delivery rate) of fuel flow to the combustor 20. Examples of suitable valves 26 can include solenoid valves, and any other type of electrically-actuated valve that can be controlled by a central control unit 25. In addition to the fuel, oxygen and an additive described below can be combined to form a fuel combination for the combustor 20.

Turning back to the gas turbine 10, the turbine also includes a turbine region 28 housing at least one turbine 30 disposed downstream of the combustor 20 to be rotated by the hot gases traveling through the gas turbine 10. An output shaft 32 is adapted to be operatively coupled between the turbine 30 and a load for transmitting a rotational force from the turbine 30 to the load. The load shown in FIG. 1 as a generator 34 of electric power. Similar to the compressor 12, the turbine 30 includes a hub 27 supporting an array of blades 29 on which the moving air is imparted to rotate the turbine 30, and accordingly, the output shaft 32. It is to be appreciated that the shown turbine is only an example and that the structure, construction, configuration, etc. May be varied.

Focusing now upon the control unit 17, the unit is operatively connected to the gas turbine 10, schematically shown by the double arrowhead line. In general, the schematic arrowhead lines represent operative connections. Also shown as part of the control system 17 in FIG. 1 is the central control unit 25, which can be formed from a combination of suitable electronic hardware, and optionally software, for controlling operation of the gas turbine 10, including during transitional periods when the gas turbine 10 transitions between operational modes. For example, the gas turbine 10 can transition between an offline mode during which the gas turbine 10 is driving no load or driving an initial load, to a partial-load mode during which the gas turbine 10 is driving a fraction of its rated load capacity, or to a full-load mode in which the gas turbine 10 is driving approximately 100% of its rated load. The load driven by the gas turbine 10 in the partial-load mode or full-load mode is greater than the load driven by the gas turbine 10 in the no load or initial-load modes from which the transition begins. The extent of the load on the gas turbine 10 can correspond to the output power required to be produced by the gas turbine 10 to drive the generator 34 or other type of load as requested.

The steps that can be performed by the central control unit 25 can optionally be carried out by discrete analog and/or digital circuit components that collectively form logic circuits, can optionally be carried out at least in part by a programmable digital controller such as a microprocessor executing computer-executable instructions stored on a computer-readable medium in communication with the central control unit 25, or any combination thereof. Examples of the computer-readable medium include, but are not limited to flash memories such as EEPROMs, EPROMs, and the like; solid state or magnetic storage devices such as hard disk drives, or any other optical, magnetic, electronic etc. storage devices in communication with the central control unit 25 that can store computer-executable instructions in an electronic format.

The central control unit 25 can include a user interface 36 provided with an optional input device such as a keyboard 38, a display screen 40, any other type of interface that enables an external influence to input a signal requesting a transition of the gas turbine's operation from driving one load to driving an increased load into the control system 17, or any combination thereof. In response, the output power of the gas turbine can be increased accordingly to enable the increased load to be driven by the gas turbine 10. Such request for a load transition can include a request for starting the gas turbine 10 from a standby or idled state, in which the gas turbine 10 is inactive, or produces zero output power—a transition commonly referred to as a startup. Or such the gas turbine 10 can be requested to transition from driving a first load (e.g., from a partial-load mode) that is not zero to driving the increased load (e.g., full-load mode), which is greater than the first load.

As another example, the operator can input an operational setting such as an output power the operator would like the generator 34 to produce, directly input a desired angular velocity of the gas turbine 10, directly input a desired air velocity the operator would like the gas turbine 10 to generate, etc. . . . . . According to alternate embodiments, the request for the gas turbine 10 to drive an increased load can optionally come from a sensor (not shown) operatively connected to communicate with the control system 17 automatically in response to sensing a predetermined condition, or from any other signal source.

Turning back to the fuel traveling toward the gas turbine 10, a temperature sensor 44 is provided to sense the temperature of the fuel being supplied to the gas turbine 10 and transmit a signal indicative of the sensed temperature to the control system 17. The signal transmitted by the temperature sensor 44 can be indicative of a temperature of the fuel before being heated, or after being heated by a heat exchanger 58 as shown in FIG. 1. But regardless of where the temperature of the fuel is sensed, the signal transmitted is indicative of the temperature of the fuel being introduced into the combustor 20.

A comparator 50 is provided to the control system 17 to compare the temperature of the fuel to a target temperature available to the central control unit 25. The comparator 50 can be a summing node as shown, or any other suitable device for comparing the temperature of the fuel determined by the temperature sensor 44 to a target temperature, and optionally calculating a difference between those temperatures. For example, the comparator 50 can determine whether the temperature of the fuel is less than the target temperature of the fuel that should be introduced into the combustor 20 for producing the suitable Wobbe Index to allow the gas turbine 10 to substantially continuously transition to drive the increased load as described in detail below.

The target temperature can optionally be retrieved from the computer-readable medium with which the central control unit 25 can communicate. For example, the target temperature can be retrieved from a look-up table of target temperatures corresponding to various values of the increased load stored by the computer-readable medium. According to other embodiments, the target temperatures corresponding to the various values of the increased load can be obtained from a curve relating target temperatures to various values of the increased load, experimental data, or any other suitable data stored by the computer-readable medium. Yet other embodiments enable a target temperature to be manually input.

The result of the comparison of the fuel temperature to the target temperature can be entered into a Wobbe Index adjustment correlation 52 relating the temperature difference between the fuel and the target temperature to a flow rate or quantity of an additive to be introduced into the combustor 20 in addition to the fuel. The combination of the fuel and additive is referred to herein as a fuel combination. The flow rate of the additive corresponding to the temperature difference determined by the comparator 50 is a flow rate at which the additive can be introduced into the combustor to create a fuel combination having a suitable Wobbe Index to promote a substantially continuous transition of the gas turbine to drive the increased load as described with reference to FIG. 3.

The Wobbe Index is a value that allows for a comparison of the volumetric energy content of different fuel gases at different temperatures. Fuels having a similar Wobbe Index can be expected to perform similarly when combusted by the gas turbine 10. One example definition of a Wobbe Index is commonly referred to as a Modified Wobbe index and is generally defined as the relative fuel heating value divided by the relative density, and deviations of ±5% from the defined value for each fuel are typically acceptable without noticeable degradation in the gas turbine's operation. It is to be appreciated that other criteria could be utilized to determine an associated Wobbe Index. Turning to one example, the example Wobbe Index is:

$$\text{Wobbe Index} = \frac{LHV}{\sqrt{T_g \times SG}}$$

Where:
LHV=Lower Heating Value (Btu/scf)
$T_g$=Absolute temperature (expressed in units compatible with other equation variables such as Kelvin or Rankine)
SG=Specific gravity relative to air at standard temperature and pressure.

However, significant variations in Wobbe Index much greater than ±5% from the specified value can lead to unacceptable levels of combustion dynamics. That is, it has been determined that combustion dynamics are a function of the Wobbe Index. Consequently, operation at high levels of variations in the Wobbe Index from a specified value can result in hardware distress, reduced component life of the combustion system and a potential for power generation outage If the temperature of the fuel without the additive is sufficient to establish the suitable Wobbe Index, then the additive is unnecessary to enable the gas turbine 10 to undergo the substantially continuous transition to the increased load. If, on the other hand, the temperature of the fuel is less than the target temperature such that the Wobbe Index of the fuel introduced alone into the combustor 20 would not fall within the design tolerance of Wobbe Indices of the gas turbine, the control system 17 can actuate a valve 56 or other fluid flow controller to control introduction of the additive into the combustor 20. The control system 17 can adjust the ratio of fuel to additive in the fuel combination to establish the suitable Wobbe Index for the transition to the increased load. This ratio can be adjusted by varying a delivery value (e.g., flow rate) of the additive by manipulating the control valve 56 between the supply 54 and the gas turbine 10 for example. The adjustment may be for a particular fuel staging.

The additive can be any inert gas, examples of which include nitrogen. It is to be understood that other inert gas could be used. Still further, the additive could be other types of gas that would effect on the Wobbe Index. For example, another combustible gas that had a substantially different Wobbe Index could be used to provide an overall desired Wobbe control.

FIG. 1 shows the additive being combined with the fuel to form the fuel combination externally of the combustor 20 by a mixer 60. This fuel combination can then be introduced into the turbine and accordingly to the combustor 20 as a mixture. However, according to alternate embodiments the additive can optionally be injected into the combustor 20 separate from the fuel or anywhere between the combustor and an external mixer 60.

The control system 17 can also optionally communicate with a heat exchanger 58, a bypass valve, fuel control valve 26, or other device for controlling, or at least initiating heating of the fuel when necessary to produce the output power required to satisfy the request for the increased output power.

Figure 2:
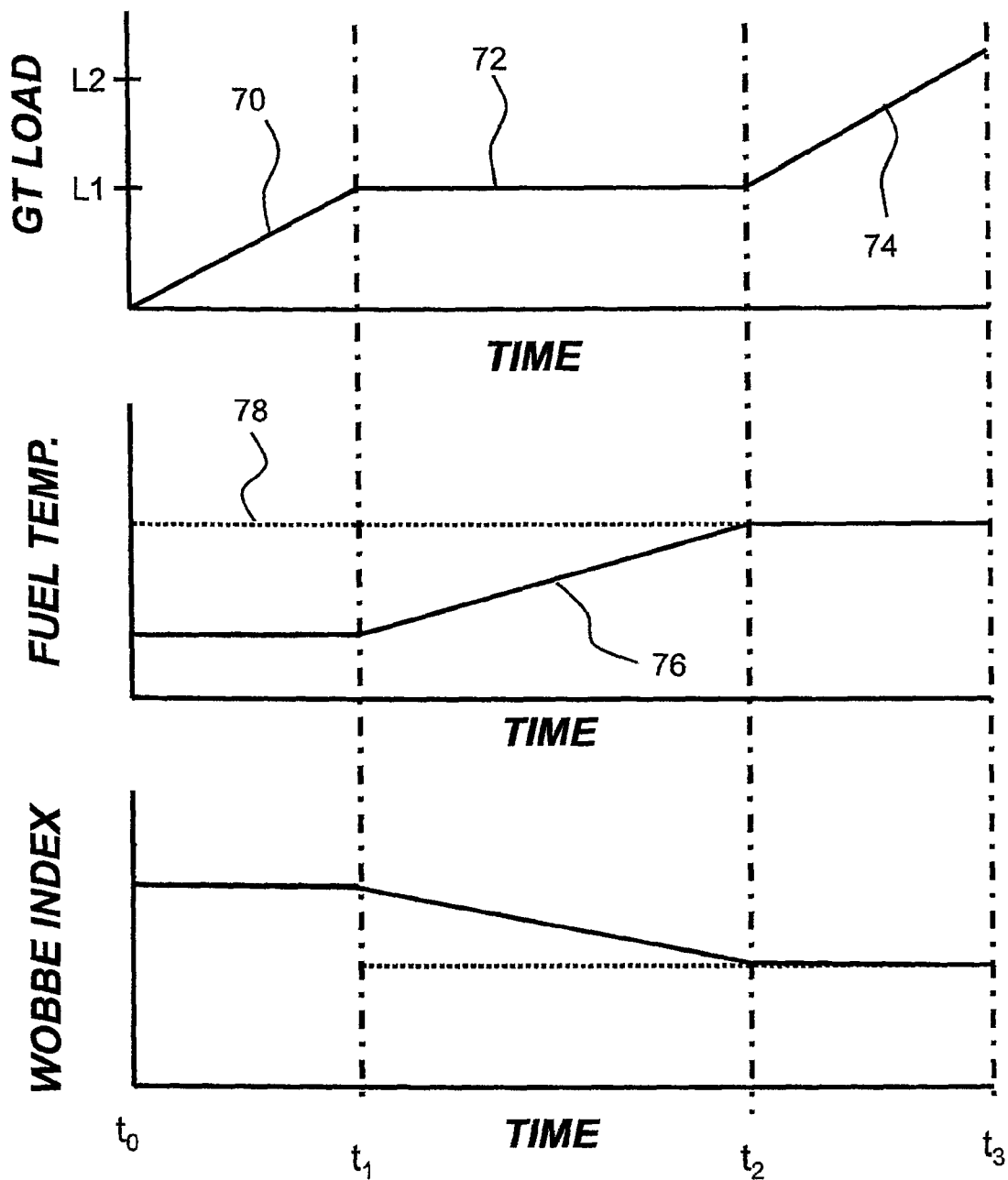
FIG. 2 shows an illustrative timing diagram including a delay in loading a gas turbine, and shows gas turbine loading, fuel temperature and Wobbe index.

When a request for the gas turbine 10 to drive an increased load is received by the control system 17, the control system initiates transient operations to adjust the output power of the gas turbine 10 to accommodate the increased load. For the sake of clarity, an example of a transition to the increased load will be described as a startup of the gas turbine 10 from a dormant state to a full-load state where the gas turbine 10 is to drive its full rated load. FIG. 2 shows a gas turbine loading (GT load) curve plot, a fuel temperature curve plot and a Wobbe index curve plot as functions of a common time scale.

Fuel heating is initiated by the GT load increasing to L1. Prior to reaching L1 at time $t_1$ there may be no fuel heating as that may provide an incorrect Wobbe for the fuel staging at those loads. When the GT load reaches L1 at time $t_1$, the load becomes constant while fuel temperature increases and Wobbe continues to decrease. When the temperature/Wobbe requirement has been met at $t_2$, loading continues from L1 to L2.

FIG. 2 shows a gas turbine loading curve and a fuel temperature curve, both as functions of a common time scale. As shown in FIG. 2, at time $t_0$ the request to transition the gas turbine 10 to drive the increased load is received by the control system 17. The fuel is not being heated prior to time $t_1$, and thus the temperature of the fuel from the fuel supply 24 (FIG. 1) sensed by the temperature sensor 44 (FIG. 1) is approximately the ambient temperature of the fuel, as indicated by the fuel heating curve in FIG. 2. Heating can be initiated by the control system 17 at time $t_1$, thereby causing the fuel temperature to continue to rise after $t_1$ as shown by sloped line segment 76 in the fuel temperature curve of FIG. 2.

Operation and initial loading of the gas turbine 10 can begin substantially immediately following receipt of the request by the control system 17. The initial loading of the gas turbine 10 is represented by the sloped line segment 70 on the gas turbine loading curve shown in FIG. 2. In this initial combustion mode that is active between times $t_0$ and $t_1$, the temperature of the fuel, even unheated, is sufficient to establish a Wobbe Index that allows stable operation (i.e., operation with minimal combustion dynamics by combusting a fuel having a Wobbe Index within a range of tolerable Wobbe Indices for which the gas turbine 10 was designed), of the gas turbine 10 from time $t_0$ to time $t_1$. Stable operation of the gas turbine 10 will minimize the combustion dynamics experienced by the gas turbine 10, and thereby minimize the exposure of the gas turbine 10 to damage from such dynamics.

The load on the gas turbine 10 represented in the loading curve of FIG. 2 gradually increases to a first transition load L1 at time $t_1$, which corresponds in the present example to a point where a combustion mode transition is required to further load the gas turbine 10. For example, the gas turbine 10 can optionally be operable in a plurality of different combustion modes, optionally including a plurality of combustors that combust fuel differently depending on the mode in which the gas turbine 10 is operating. To further increase the load on the gas turbine 10 above the first transition load L1 the gas turbine 10 must transition to a second combustion mode that is different than the initial combustion mode used from time $t_0$ to time $t_1$. The second combustion mode is capable of producing enough output power to drive the increasing load above the first transition load L1, but requires a different Wobbe Index of the fuel than the Wobbe Index of the fuel combusted in the initial combustion mode. To establish this Wobbe Index for the second combustion mode the temperature of the fuel is to be raised by heating the fuel using the hot exhaust gas from the gas turbine 10 and the heat exchanger 58 (FIG. 1), by using steam or other medium from a bottoming cycle, or any other type of heater. As can be seen from the sloped segment 76 of the fuel temperature curve of FIG. 2, the temperature of the fuel continues to rise due to heating between times $t_1$ and $t_2$. The temperature of the fuel must reach a target temperature corresponding to the Wobbe Index that must be established for the second combustion mode. This target temperature is represented in the fuel temperature curve of FIG. 2 by the dashed line 78.

While the temperature of the fuel is being elevated, however, further loading of the gas turbine 10 above the first transition load L1 is delayed until the temperature of the fuel can be sufficiently heated to establish the Wobbe Index required to enable stable operation of the gas turbine 10 in the second combustion mode. The substantially constant load on the gas turbine 10 between times $t_1$ and $t_2$ can be seen represented by horizontal line segment 72 in the loading curve of FIG. 2. The delay while waiting for the fuel to be heated can be lengthy, and can be unsatisfactory if the assembly in questions requires a rapid response to the request for driving the increased load.

Once the fuel temperature in the fuel temperature curve of FIG. 2 reaches the target temperature represented by dashed line 78 required to establish the Wobbe Index for the second combustion mode at time $t_2$, the second combustion mode can be initiated and loading of the gas turbine 10 above the first transition load L1 can continue. This further loading of the gas turbine 10 is indicated by the sloped line segment 74.

To minimize delays in loading the gas turbine 10, such as that described with reference to FIG. 2, the present invention establishes the Wobbe Index required for the second combustion mode without having to wait for the fuel to be adequately heated. Thus, the loading of the turbine according to the embodiment described with respect to FIG. 3 can be substantially continuous, and uninterrupted.

Figure 3:
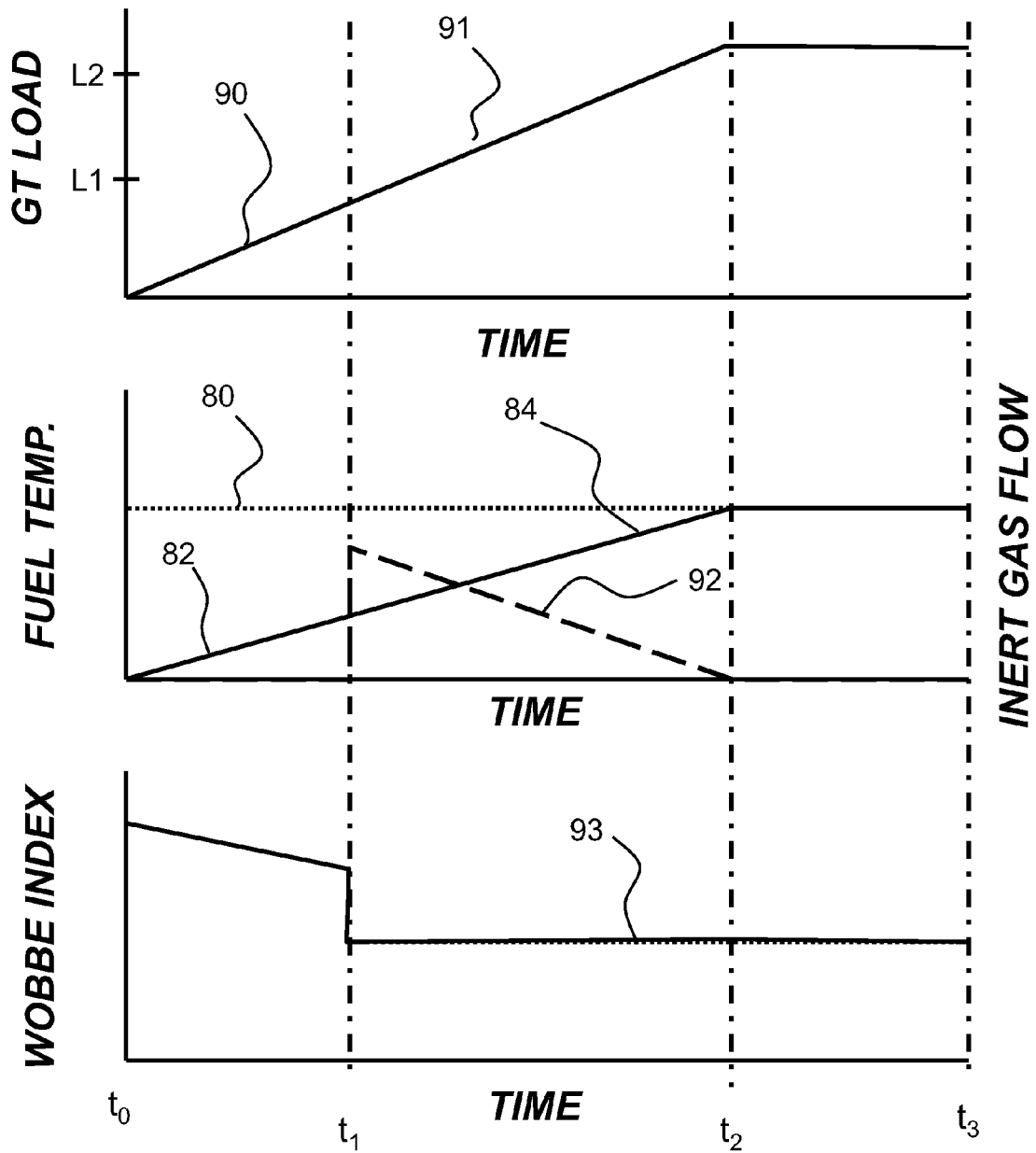
FIG. 3 shows an illustrative timing diagram exhibiting a substantially continuous loading of a gas turbine according to an aspect of the invention, and shows gas turbine loading, fuel temperature and Wobbe index.

FIG. 3 shows a gas turbine loading (GT load) curve plot, a fuel temperature curve plot and a Wobbe index curve plot as functions of a common time scale, according to an embodiment of the invention. The starting point at $t_0$ is the same as it is in FIG. 2, namely, at time $t_0$ the request to transition the gas turbine 10 to drive the increased load is received by the control system 17. Again, the fuel is not being heated prior to time $t_0$, and thus the temperature of the fuel from the fuel supply 24 (FIG. 1) sensed by the temperature sensor 44 (FIG. 1) is approximately the ambient temperature of the fuel, as indicated by the fuel heating curve in FIG. 3. Heating can be initiated by the control system 17 at time $t_0$, though FIG. 3 shows heating starting at time $t_1$ similar to FIG. 2, thereby causing the fuel temperature to begin to rise toward the target temperature (represented by dashed line 80 in the fuel temperature curve of FIG. 3) between times $t_1$ and $t_2$ as shown by sloped solid line segment 84 of that same curve. Line segment 82 of the curve shows an unheated temperature scenario for that segment, with the ultimate goal being the achieving of the target temperature as mentioned above.

Operation and initial loading of the gas turbine 10 (FIG. 1) can begin substantially immediately following receipt of the request by the control system 17 (FIG. 1). The initial loading of the gas turbine 10 (FIG. 1) is represented by the sloped line segment 90 between times $t_0$ and $t_1$ on the gas turbine loading curve shown in FIG. 3. In this initial combustion mode that is active between times $t_0$ and $t_1$, the temperature of the fuel, even unheated, is sufficient to establish a Wobbe Index that allows stable operation (i.e., operation with minimal combustion dynamics by combusting a fuel having a Wobbe Index within a range of tolerable Wobbe Indices for which the gas turbine 10 was designed), of the gas turbine 10 from time $t_0$ to time $t_1$.

The load on the gas turbine 10 represented in the loading curve of FIG. 3 gradually increases to a first transition load L1 at time $t_1$, which corresponds in the present example to a point during loading where a combustion mode transition is required to further load the gas turbine 10. To further increase the load on the gas turbine 10 above the first transition load L1 the gas turbine 10 must transition to a second combustion mode that is different than the initial combustion mode used from time $t_0$ to time $t_1$. The second combustion mode is capable of producing enough output power to drive the increasing load above the first transition load L1, but requires a different Wobbe Index of the fuel than the Wobbe Index of the fuel combusted in the initial combustion mode.

In the example described with reference to FIG. 2, further loading was discontinued until the temperature of the fuel could be heated to establish the necessary Wobbe Index of the fuel. In contrast, the control system 17 (FIG. 1) of the embodiment described with reference to FIG. 3 initiates and controls introduction of the additive into the combustor 20 (FIG. 1) at an appropriate time to form the fuel combination with a suitable Wobbe Index in the combustor, allowing the gas turbine 10 to transition into the second combustion mode substantially continuously, optionally without interruption of the loading of the gas turbine 10. The introduction of the inert gas or other suitable additive into the combustor 20 can be timed to minimize delays between transitions from one combustion mode to another and/or minimize interruptions and delays in increasing the load on the gas turbine 10 from one load to another. Minimizing delays between transitions and/or loading of the gas turbine 10 can also be accomplished without prematurely adjusting the Wobbe Index of the fuel too early, such as when the initial combustion routine is still active, to cause unstable operation of the gas turbine 10 during the initial combustion routine. According to the present embodiment, the Wobbe Index can be maintained substantially constant by controlling the flow of the additive introduced into the combustor 20.

With continued reference to FIG. 3, at time t1 when the load on the gas turbine 10 approaches the first transition load L1 requiring the second combustion mode for further loading, the control system 17 (FIG. 1) initiates introduction of the additive into the combustor 20. The flow of the additive into the combustor 20 over time is represented by broken line 92 overlaid on the fuel temperature curve in FIG. 3. As shown, the flow of the additive peaks at about time $t_1$ when the gas turbine 10 (FIG. 1) is to transition into the second combustion mode to continue loading the gas turbine 10. This peak represents the greatest temperature difference between the target temperature of the fuel and the fuel temperature sensed by sensor 44 at a time when the transition of the gas turbine 10 to the second combustion mode is required. The introduction of the additive to create the fuel combination establishes the suitable Wobbe Index to transition the gas turbine 10 into the second combustion mode under stable operation of the gas turbine 10. It also allows loading of the gas turbine 10 substantially continuously, with minimal interruptions to wait for the fuel to be heated to achieve the Wobbe Index for stable operation of the gas turbine 10 in the second combustion mode. The substantially continuous loading of the gas turbine 10 can be seen from the substantially linear line segment extending from time $t_0$ to time $t_2$ collectively formed by line segments 90 and 91 in FIG. 3. The significant horizontal line segment 72 (FIG. 2) representing a substantially constant load from time $t_1$ to $t_2$ in FIG. 2 is absent from that same time period in the embodiment shown in FIG. 3. Thus, the time required to rapidly respond to the request for driving the increased load and fully loading the gas turbine 10 (FIG. 1) with the increased load (increased load represented in FIG. 2 and FIG. 3 load L2) is shortened from time $t_3$ in FIG. 2 to time $t_2$ in FIG. 3.

Further according to the embodiment represented in FIG. 3, the control system 17 (FIG. 1) can continue to control heating of the fuel in parallel with controlling introduction of the additive into the combustor 20. Thus, the sloped line segment 84 in the fuel temperature curve of FIG. 3 is sloped as the temperature of the fuel approaches the target temperature represented by line 80.

The flow and/or quantity of the additive into the combustor 20 (FIG. 1) can be controlled by the control system 17 based at least in part on the difference between the target temperature and the temperature sensed by the temperature sensor 44. For example, the flow rate of the additive can be controlled by the control system 17 to be proportional to the difference between the target temperature and the temperature sensed by the temperature sensor 44. Thus, the greater the temperature difference the greater the flow rate of the additive into the combustor 20. Eventually, when the temperature of the fuel reaches the target temperature required to maintain the suitable Wobbe Index in the absence of the additive as shown at time $t_2$ in FIG. 3, the control system 17 can discontinue the flow of the additive into the combustor 20 (FIG. 1). Thus, unstable operation of the gas turbine 10 and the time required to fully load the gas turbine 10 over a plurality of combustion modes are minimized.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention.

What is claimed is:

1. A method of controlling a transition of a gas turbine, said method including:
   receiving a request of the gas turbine to drive an increased load, wherein said increased load is greater than a load being driven by said gas turbine when said request is received;
   determining that a temperature of a fuel to be ignited within a combustor of said gas turbine is less than a target temperature of said fuel to be introduced into said combustor for driving said increased load;
   controlling introduction of an additive into said combustor of said gas turbine to introduce a first quantity of said additive into said combustor concurrently with heating of the fuel when said temperature of said fuel is less than said target temperature to establish a suitable Wobbe Index of a fuel combination to promote a substantially continuous transition of the gas turbine to drive the increased load, wherein said fuel combination includes the fuel and the additive; and
   controlling said introduction of the additive to reduce an amount of the additive being introduced to the combustor from the first quantity to a second quantity that is less than the first quantity in response to a determination that the temperature of the fuel has been elevated to the target temperature.

2. The method of claim 1, wherein controlling introduction of the additive into the combustor includes adjusting a flow rate of the additive into the combustor.

3. The method of claim 2, wherein the flow rate is adjusted based at least in part on a temperature difference between said temperature of said fuel and said target temperature.

4. The method of claim 3, wherein the flow rate is proportional to said temperature difference between said temperature of said fuel and said target temperature.

5. The method of claim 2, wherein said flow rate is adjusted during said substantially continuous transition to maintain said Wobbe Index of said fuel combination at a substantially constant value during at least a portion of said substantially continuous transition.

6. The method of claim 1, wherein said load being driven by said gas turbine when said request is received is zero, corresponding to an idle state during which the gas turbine is not driving said load.

7. The method of claim 1, wherein the additive is an inert gas.

8. The method of claim 7, wherein the inert gas is nitrogen.

9. The method of claim 1, wherein said controlling said introduction of the additive to reduce the amount of the additive being introduced comprises terminating introduction of said additive into said combustor when said temperature of said fuel to be introduced into said combustor is greater than or equal to said target temperature.

10. A gas turbine for driving a load, said gas turbine including:
- a compressor for elevating a pressure of air being introduced to the gas turbine;
- a combustor in which a fuel is to be burned during operation of said gas turbine; and
- a turbine disposed downwind of the combustor to be driven by a hot gas being forced through said gas turbine; and
- a controller for controlling operation of said gas turbine during a transition of the gas turbine from driving an initial load to driving an increased load, wherein said controller includes:
  - a receiver component for receiving a request for the gas turbine to drive said increased load, wherein said increased load is greater than said initial load being driven by said gas turbine when said request is received;
  - a comparison component for comparing a temperature of the fuel to be ignited within a combustor of said gas turbine to a target temperature of the fuel to determine whether the temperature of the fuel is less than the target temperature of said fuel to be introduced into said combustor for driving said increased load; and
  - a computational component for controlling heating of the fuel and introduction of a first quantity of an additive into said combustor of said gas turbine when said temperature of said fuel is less than said target temperature to establish a suitable Wobbe Index of a fuel combination to promote a substantially continuous transition of the gas turbine to drive the increased load, and for concurrently reducing an amount of the additive introduced to the combustor to a second quantity to maintain the suitable Wobbe Index as the temperature of the fuel is elevated to the target temperature, wherein said fuel combination includes the fuel and the additive.

11. The gas turbine of claim 10 further including an output shaft operatively connected to the turbine, where said output shaft is adapted to be operatively connected to rotate a rotor of an electric generator.

12. The gas turbine of claim 10, wherein said suitable Wobbe Index is maintained substantially constant during said transition.

13. The gas turbine of claim 10, wherein controlling introduction of the additive into the combustor by the controller includes adjusting a flow rate of the additive into the combustor.

14. The gas turbine of claim 13, wherein said flow rate is adjusted based at least in part on a temperature difference between said temperature of said fuel and said target temperature.

15. The gas turbine of claim 13, wherein the flow rate is proportional to said temperature difference between said temperature of said fuel and said target temperature.

16. The gas turbine of claim 13, wherein said flow rate is adjusted during said transition to maintain said Wobbe Index of said fuel combination at a substantially constant value during at least a portion of said transition.

17. A method of controlling a transition of a gas turbine, said method including:
- receiving a request of the gas turbine to drive an increased load, wherein said increased load is greater than a load being driven by said gas turbine when said request is received;
- determining that a temperature of a fuel to be ignited within a combustor of said gas turbine is less than a target temperature of said fuel to be introduced into said combustor for driving said increased load; and
- controlling introduction of an additive into said combustor of said gas turbine when said temperature of said fuel is less than said target temperature to establish a suitable Wobbe Index of a fuel combination to promote a substantially continuous transition of the gas turbine to drive the increased load, wherein said fuel combination includes the fuel and the additive, wherein controlling introduction of the additive into the combustor includes adjusting a flow rate of the additive into the combustor based at least in part on a temperature difference between said temperature of said fuel and said target temperature.

18. A gas turbine for driving a load, said gas turbine including:
- a compressor for elevating a pressure of air being introduced to the gas turbine;
- a combustor in which a fuel is to be burned during operation of said gas turbine; and
- a turbine disposed downwind of the combustor to be driven by a hot gas being forced through said gas turbine; and
- a controller for controlling operation of said gas turbine during a transition of the gas turbine from driving an initial load to driving an increased load, wherein said controller includes:
  - a receiver component for receiving a request for the gas turbine to drive said increased load, wherein said increased load is greater than said initial load being driven by said gas turbine when said request is received;
  - a comparison component for determining that a temperature of a fuel to be ignited within a combustor of said gas turbine is less than a target temperature of said fuel to be introduced into said combustor for driving said increased load; and
  - a computational component for controlling introduction of an additive into said combustor of said gas turbine when said temperature of said fuel is less than said target temperature by adjusting a flow rate of the additive into the combustor based at least in part on a temperature difference between the temperature of the fuel and the target temperature to establish a suitable Wobbe Index of a fuel combination to promote a substantially continuous transition of the gas turbine to drive the increased load, wherein said fuel combination includes the fuel and the additive.

* * * * *